Nov. 10, 1942. W. McBAIN 2,301,899
MANUFACTURE OF METALLIC CHAIN LINKS
Filed Aug. 14, 1940 2 Sheets-Sheet 1

INVENTOR:
WILLIAM McBAIN
BY
Haseltine Lake & Co.
ATTORNEYS

Nov. 10, 1942.     W. McBAIN     2,301,899
MANUFACTURE OF METALLIC CHAIN LINKS
Filed Aug. 14, 1940     2 Sheets-Sheet 2
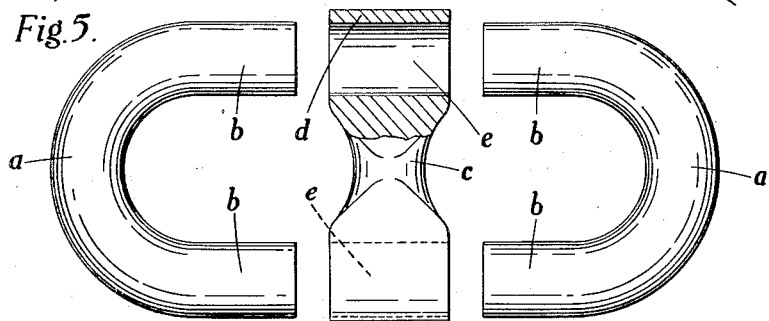
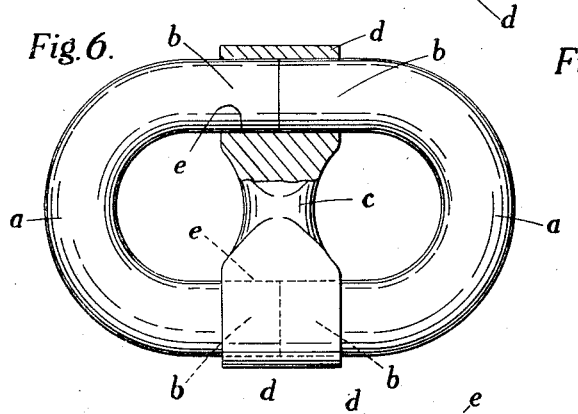 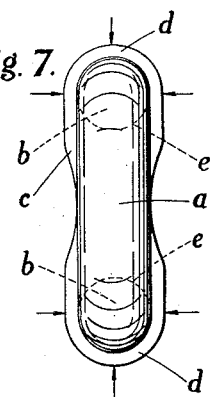
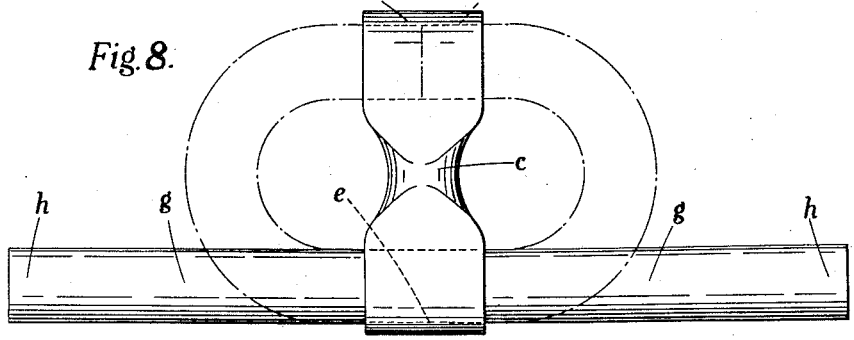
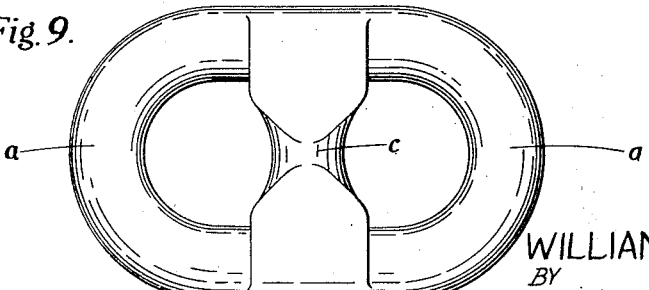
INVENTOR:
WILLIAM MCBAIN
BY
Haseltine, Lake & Co.
ATTORNEYS.

UNITED STATES PATENT OFFICE 2,301,899

MANUFACTURE OF METALLIC CHAIN LINKS

William McBain, Newcastle-on-Tyne, England, assignor of one-half to Swan, Hunter & Wigham Richardson Limited, Walker, Newcastle-on-Tyne, England, a British company Application August 14, 1940, Serial No. 352,593
In Great Britain September 18, 1939

3 Claims. (Cl. 219—10)

The invention relates to the manufacture of metallic chains or chain cables.

The ordinary method of making links for chains is to shape a wrought-iron bar into a ring-like member and to join the ends by forging or swaging.

It has, however, been proposed to manufacture chain links by making each link of two oppositely disposed U-pieces, the ends of which are grooved or serrated and are entered into heated metallic sleeves which may be joined to constitute a supporting stud and which are subjected to a swaging operation to cause the metal thereof to flow into the grooves or serrations. Apart from the fact that it is by no means a simple matter to produce links in this fashion, experience indicates that such links are not satisfactory in practice as they break at the joint when under heavy load.

It has further been proposed to make chain links by forming the ring of the link in two separate parts which are joined together by flash-welding, that is to say, by arranging each part as an electrode in an electric circuit and thereafter bringing the parts towards one another to cause an arc to be struck between them, the arc resulting in local fusion of the metal whereby one part is joined to the other. Tests have shown that links produced in this manner also are not satisfactory in practice as they fail at the joint under load. Investigations indicate that such failure is attributable to the deleterious effect on the metal at the joint, of the arc in the presence of air, it having been found that the original tensile characteristics of the metal over the whole surface of the joint are not preserved in the finished link.

It is the primary object of the present invention to provide a method of manufacturing chain links which is not only simple in practice but which will give finished links, and consequently finished chains, of greater strength than those produced by methods hitherto used or proposed.

Following the principles of the invention, I provide that the ends of the member or members constituting the ring of the link, or link proper, shall be entered, with a snug fit, into a sleeve from opposite extremities thereof (or into sleeves if the ring has more than two ends), the said ends being caused to abut against one another within the sleeve. I then provide that an electrical welding current shall be passed through the sleeve at the place where the ends of the ring member or members abut and that a forging pressure shall be applied at such place while the metal is plastic.

The ring of the link may be constituted by a single piece of metal bar which is initially straight and the ends of which are bent round and entered into the sleeve from opposite extremities thereof, thereafter being joined in the manner referred to above.

Preferably, however, the ring of the link consists of two oppositely disposed U-pieces which have their adjacent ends entered, from opposite directions, into a sleeve until these ends abut against one another within the sleeve. It will be understood that in this case, as the ring will have four ends, there will be two sleeves for each link. When the U-pieces and sleeves have been assembled, the welding and forging steps previously mentioned are applied to both sleeves for the purpose of positively joining the U-pieces together.

It has been found that a link produced in the manner indicated is highly satisfactory in regard to the strength of the weld or welds. This is attributable to the fact that the sleeve, or each of the sleeves, used for embracing the ends of the ring of the link is designed to fit closely around the said ends with the result that it acts to exclude, or substantially exclude, air during the welding operation. Thus the metal of the ring is shielded against oxidation while in a fused condition, from which it follows that the inherent characteristics of the metal are preserved at the joint and an efficient joining of the metal is obtained over the whole of the cross-section where the ends of the ring abut against one another. Moreover, the sleeve acts to prevent the formation of a hard and rough burr at the joint, which is a fault met with when making links by the flash-welding method.

The application of the welding current through the sleeve has the effect also of joining the sleeve to the ring, but this is merely incidental as it has been found that great strength obtains at the joint even after the surplus material resulting from the presence of the sleeve has been removed.

The forging pressure applied while the metal of the ring is still plastic after the welding operation, is of value as it tends to compact the metal at the joint and remove any trace of sponginess created in the metal as the result of the welding operation.

The method of the invention lends itself admirably to the efficient construction of links with supporting studs, such as are used in chain cables which have to withstand heavy loads and which would tend to collapse or fracture in the absence of such studs. For this purpose, the link according to the invention is constructed with the aid of two sleeves which are joined together to constitute the supporting stud. In practice the stud and sleeves are made from a unitary piece of metal so that, in effect, the stud has apertures at its ends giving the equivalent of the sleeves.

It is important to note that the method according to the invention readily lends itself to the production of links, and consequently chains, made of steel, since mild steel can be readily welded in the manner indicated. In this way it is possible to provide a link from thinner stock but capable of standing up to the same duty as links made by other methods from thicker stock. Moreover, by the method according to the invention, the metal from which the ring is made retains its grain in continuity or substantial continuity at its greatest strength.

For a better understanding of the nature of the invention reference will now be made to the accompanying drawings which exemplify, by way of example, four different modes of manufacturing links in accordance with the method of the invention, two of these modes being concerned with ordinary links and the other two with links having supporting studs.

In the drawings:

Figure 5 is a plan view, partly in section, of the component parts of a link with a supporting stud, before assembly, there being in this instance three component parts;

Figure 6 is a view similar to Figure 5 showing the position assumed by the three parts when fitted together;

Figure 7 is an end view corresponding to Figure 6;

Figure 8 is a plan view indicating how a link with a supporting stud can be made from two component parts, and Figure 9 is a plan view showing how a link made according to Figures 5 to 8 may appear in its finished condition.

In the ensuing description the figures given are for ¾ inch links, i. e. links of standard size made from ¾ inch diameter material. In the present instance, however, the material is rolled steel bar.

Figure 1:
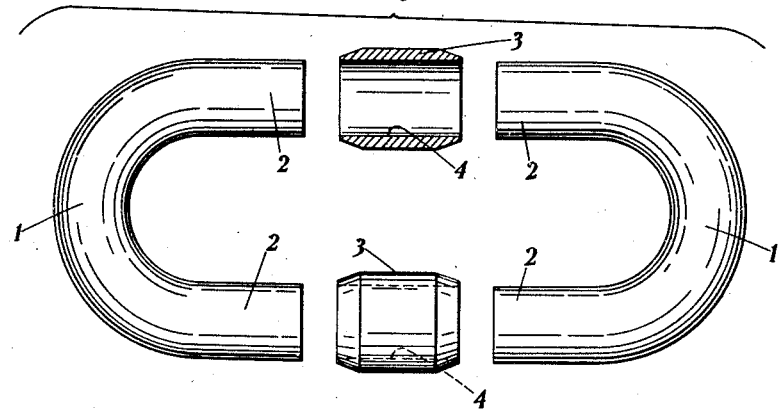
Figure 1 is a plan view, partly in section, of the component parts of a link for an ordinary chain, before they are assembled, there being in this instance four component parts.
Figure 2:
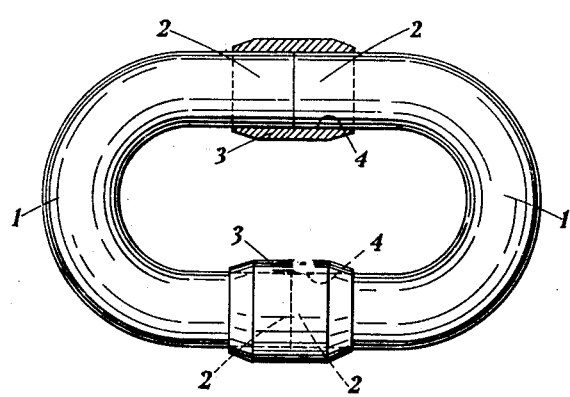
Figure 2 is a view similar to Figure 1, showing the position assumed by the parts when fitted together.
Figure 3:
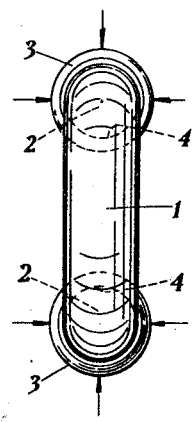
Figure 3 is an end view corresponding to Figure 2.

Referring first to Figures 1 to 3, the ring of the link, or link proper, is composed of two U-pieces 1, each made from the ¾ inch bar. The ends 2 of these pieces are cut off square so that when the pieces are laid in the position indicated by Figure 1 and are brought together, the adjacent ends of the pieces will fit closely against one another. Two sleeves 3, each about one inch external diameter, are also provided, the apertures 4 therein being of a cross-section conforming closely to the cross-section of the bar from which the U-pieces 1 are made so that they will be capable of fitting snugly over the ends 2 of the U-pieces. The sleeves 3 are of steel but they need not necessarily be of that metal. However, the material from which they are made must be such that they will not prematurely fuse when the welding current is applied. The ends 2 of the U-pieces 1 are inserted in the apertures 4 in the sleeves 3 from opposite extremities of the latter and by means of clamping apparatus (not shown) the said ends are caused to abut closely against one another midway, or approximately midway, between the extremities of the said apertures as indicated in Figure 2. A welding current of, for example, about 20,000 amperes is now passed through the points of the sleeves where the ends of the U-pieces adjoin, by the application of a potential of about 4–5 volts, such current being allowed to pass for a period of about thirty seconds. With this procedure there is little or no oxidation at the joints as, for practical purposes, air is precluded from coming into contact with the plastic metal at the welds.

After the welding step and while the metal is still plastic, a forging pressure of about one ton per square inch is applied, preferably hydraulically, to each heated spot and thereafter the link is allowed to cool. The points of application of the welding current and forging pressure are generally indicated by the arrows in Figure 3.

In view of the plastic metal being imprisoned by the application of hydraulic pressure it is restrained against expansion and consequently receives a heavy forging effect. If there has been any expansion during the welding operation the forging pressure subsequently applied acts to compact the metal and restore it substantially to its original condition.

The welding machine employed, and which it is unnecessary to illustrate, may have one set of electrodes so that the welding (and forging) to effect a joining of the U-pieces together takes place in two stages first as to one side of the link and then as to the other side. The welding machine may, however, have two sets of electrodes so that the welds are effected simultaneously, followed by the application of forging pressure at both sides of the link at the same time.

Surplus metal left by the presence of the sleeves 3 after the joining operation may, if desired, be trimmed off.

The link is annealed in the usual manner after the joining operation or after the trimming step if the latter is employed.

Figure 4:
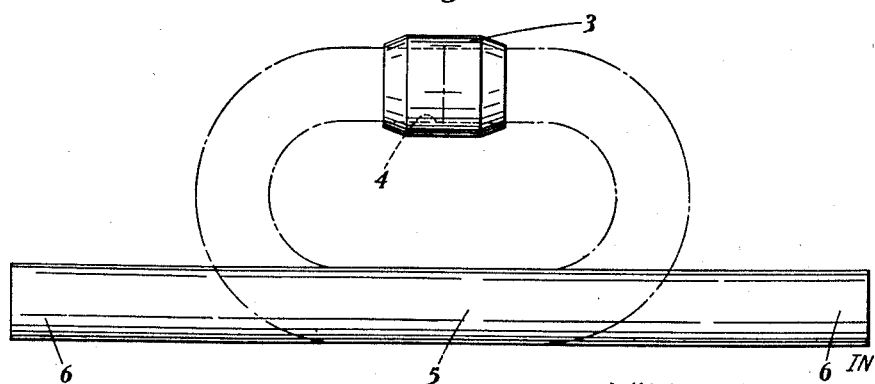
Figure 4 is a plan view indicating how a link for an ordinary chain can be made from two component parts.

The embodiment so far described involves the use of four component parts, namely, the two U-pieces 1 and the two sleeves 3. Figure 4 shows how a similar sort of link may be produced while using only two component parts. In this instance the ring of the link, or link proper, is constituted by a single piece of bar 5 which is initially straight and the ends 6 of which are cut off square as indicated in full lines in the figure. A single sleeve 3 is employed and, as indicated by the broken lines, the ends 6 of the bar 5 are bent round and entered into the aperture 4 in the sleeve from opposite extremities thereof, pressure being applied and maintained to cause the ends 6 to meet within the aperture 4 and remain in contact with each other. The said ends form a snug fit in the aperture. A welding step, followed by a forging step, is then applied at the joint in the manner previously described. After the joining operation the surplus metal left by the sleeve 3 may be trimmed off and the link is then annealed.

Referring now to the embodiment illustrated in Figures 5 to 7, it will be seen that this embodiment is in many respects similar to that illustrated in Figures 1 to 3 except that in this case the link is made from three component parts including a supporting stud. Here likewise the ring of the link is composed of two U-pieces *a* and the ends *b* of these pieces are cut off square so that when the pieces are placed in the position indicated in Figure 5 and brought together, their adjacent ends will fit closely against one another as indicated in Figure 6.

The supporting stud, generally indicated at *c*, is constituted by a joining together of two sleeves d. In the embodiment illustrated, the stud and sleeves are formed as a unitary drop-forging in steel, the sleeves being provided by the formation of apertures e in the ends of the forging so that, in effect, the stud has the equivalent of sleeves at its ends.

It will be seen that the U-pieces a are of uniform diameter throughout, while the apertures e in the stud c are of substantially the same diameter as that of the U-pieces.

When, as indicated in Figure 6, the ends b of the U-pieces a have been entered into the apertures e so that these ends abut against one another within the confines of the apertures, they are held in contact by suitable clamping means. A welding current of the order described with reference to preceding figures is now passed through the ends of the stud in the locality of the joints, this being followed by a forging operation as before. This results not only in an efficient joining together of the U-pieces constituting the ring of the link, but also in a joining of the stud to the ring. Surplus metal not necessary for retaining the stud in position may then be trimmed off, whereafter the completed link is annealed.

The fourth embodiment illustrated in Figure 8 also relates to a link with a supporting stud and serves to demonstrate how such a link may be made from only two component parts. The procedure exemplified by this figure is, in essentials, the same as that according to Figure 4. Thus, the ring of the link is constituted by a single piece of bar g the ends h of which are cut off square as indicated in full lines in the figure. The stud c, combined with sleeves d having apertures e is formed in the same way as described with reference to Figures 5 to 7. The bar g is passed through one of the apertures e until the stud lies midway between the ends h of the bar. The portions of the bar lying on each side of the stud are now bent and the ends h thereof are entered into the other aperture e and pressed together to form a butt joint as indicated in broken lines in Figure 8. The welding and forging steps already described are now applied to the stud at the place where the two ends h of the bar g meet. Similar steps may, if desired, be applied to that end of the stud where the centre portion of the bar g is located. A trimming off of surplus metal on the stud may now be effected, the link being annealed to complete the operation.

A finished link with trimmed stud, and made in accordance with the procedure exemplified by Figures 5 to 7 or that exemplified by Figure 8, has the appearance indicated in Figure 9.

With the method according to the invention, the union between the ends of the ring, or link proper, is complete, and it will be appreciated that when the welding current is applied there is substantial absence of air around the semifused ends of the ring owing to these ends being enclosed. An efficient joint therefore results.

It has been found that a link made in the manner described has exceptional strength, and in a tensile test with a link of the material and dimensions described, and including a supporting stud, it was observed that fracture did not occur until a load of 21.4 tons had been reached. Even then failure did not occur at the joints.

In making up a chain or chain cable from links constructed in accordance with the invention, several modes of procedure are available. Thus the links of the chain may be produced progressively, the ring portion for a succeeding link being entered into the loop of the preceding finished link and afterwards joined, and so on. Then again, alternate links of the chain may be completed before assembly of all the links of the chain, the intermediate joining links then being made as already described.

The figures mentioned in the foregoing as to the size of the stock, strength and duration of the welding current and the forging pressure, are merely by way of example, and it will be understood that for increase or reduction in link sizes corresponding changes in these figures may be necessary. The figures are in any case for links made of rolled steel, and differences would have occurred if wrought-iron had been taken. It is not outside the scope of the invention to make iron links and chains therefrom, but tests have proved that the invention does permit of the satisfactory production of steel links and chains which is a very important consideration since steel will for most purposes be the more desirable metal to employ in view of its strength and durability. Thus the invention makes possible the manufacture of links and chains endowed with qualities which enable a lighter link or chain to be manufactured for a similar duty in service.

What I claim and desire to secure by Letters Patent of the United States is:

1. Method of manufacturing metallic chain links comprising bending at least one piece of solid metal bar so that it conforms substantially to the desired shape of the ring of the link, entering the ends of said ring into the bore of at least one metallic sleeve from opposite extremities of the latter, the cross-sectional shape of said bore conforming closely to the cross-sectional shape of said ends of the ring so that air is substantially excluded from the bore when said ends are fitted into the sleeve, causing the ends of the ring to abut against one another within the sleeve, thereafter passing an electric welding current through the sleeve at the place where the ends of the rings abut therein so as to cause said ends to be joined to one another and to the sleeve, and thereafter applying a forging pressure to the sleeve in the locality of the joint while the metal is still plastic as the result of the welding operation so as to compact and consolidate the metal at the joint.

2. Method according to claim 1, wherein the ring of the link is made of two oppositely disposed U-pieces the adjacent ends of which are entered from opposite directions into two sleeves so that these ends abut against one another while being enclosed by the material of the sleeves, the welding and forging steps being subsequently applied to the sleeves at the places where the ends of the U-pieces abut.

3. Method according to claim 1, wherein the ring of the link is made of a single bar the ends of which are entered from opposite directions into a sleeve so as to form a butt joint therein, the subsequent welding and forging steps being applied to the sleeve in the locality of the joint.

WILLIAM McBAIN.